US005754651A

United States Patent [19]
Blatter et al.

[11] Patent Number: 5,754,651
[45] Date of Patent: May 19, 1998

[54] PROCESSING AND STORAGE OF DIGITAL DATA AND PROGRAM SPECIFIC INFORMATION

[75] Inventors: Harold Blatter; Kevin Elliott Bridgewater, both of Indianapolis; Michael Scott Deiss, Zionsville; Thomas Edward Horlander, Indianapolis, all of Ind.

[73] Assignee: Thomson Consumer Electronics, Inc., Indianapolis, Ind.

[21] Appl. No.: 696,415

[22] Filed: Aug. 13, 1996

[51] Int. Cl.$^6$ .................. H04N 7/167; H04N 7/50
[52] U.S. Cl. .................. 380/20; 386/83
[58] Field of Search .................. 380/20, 9, 4, 5, 380/49; 386/83, 95, 124

[56] References Cited

U.S. PATENT DOCUMENTS

| 5,515,106 | 5/1996 | Chaney et al. | 348/461 |
|---|---|---|---|
| 5,550,576 | 5/1996 | Klosterman | 348/6 |
| 5,587,734 | 12/1996 | Lauder et al. | 348/10 |
| 5,608,448 | 3/1997 | Smoral et al. | 348/7 |
| 5,619,249 | 4/1997 | Billock et al. | 348/7 |
| 5,619,337 | 4/1997 | Naimpally | 386/83 |

FOREIGN PATENT DOCUMENTS

| 712 256 A2 | 5/1996 | European Pat. Off. | H04N 9/804 |
|---|---|---|---|
| 712256 A2 | 5/1996 | European Pat. Off. | H04N 9/804 |
| 714 213 A2 | 5/1996 | European Pat. Off. | H04N 7/50 |
| 714213 A2 | 5/1996 | European Pat. Off. | H04N 7/50 |
| 735 776 A2 | 10/1996 | European Pat. Off. | H04N 7/50 |
| 735776 A2 | 10/1996 | European Pat. Off. | H04N 7/50 |

OTHER PUBLICATIONS

O.W. Bungum, *Transmultiplexing, Transcontrol and Transcrambling of MPEG-2/DVB Signal*, International Broadcasting Convention, 12-16 Sep. 1996, London, U.K., IEE, Conference Publication No. 428, pp. 288-293.

P.A. Sarginson, MPEG-2: *A Tutorial Introduction to the Systems Layer*, IEE Colloquium on MPEG What It Is and What It Isn't, 1995, London, U.K., pp. 4/1-4/13.

MPEG Systems Standard (ISO/IEC 13818-1, 10th Jun. 1994) -Containing Sections 2.4 and 2.6.

Digital Television Standard for HDTV Transmission of Apr. 12, 1995, prepared by U.S. Advanced Television Systems Committee, (ATSC) -Containing Section 8.4.7.1.

Placing ATV Issues on the Table, by S. Merrill Weiss, published in TV Technology, Feb. 23, 1996.

Preliminary EIA Document of Apr. 7, 1994, Version 2.0 Draft as Precursor to Unpublished EIA Draft Document IS-679, Project PN-3639 by NRSS (National Renewable Standards Committee).

International Standards Organization Document ISO 7816-3 of 1989.

O.W. Bangum : "Transmultiplexing, transcontrol and transscrambling of MPEG-2/DVB signal" International Broadcasting Convention, pp. 288-293, Sep. 12, 1996.

Sarginson: "MPEG-2: A Tutorial Introduction to the Systems Layer" pp. 4-1 4-13, 1995.

PCT/US/97/08875 Search Report, Sep. 29, 1997.

*Primary Examiner*—David C. Cain
*Attorney, Agent, or Firm*—Joseph S. Tripoli; Ronald H. Kurdyla; Alexander J. Burke

[57] ABSTRACT

A program representative packetized datastream is generated from an input packetized datastream representing a plurality of programs. Program content packets comprising a desired program selected from the plurality of programs are identified. Condensed program specific information (CPSI) suitable for use in identifying and assembling the identified packets is formed. The resulting CPSI and the identified packets are formed into a datastream. Program specific information packets and program content packets are also extracted from a packetized datastream and stored on a storage medium.

29 Claims, 5 Drawing Sheets

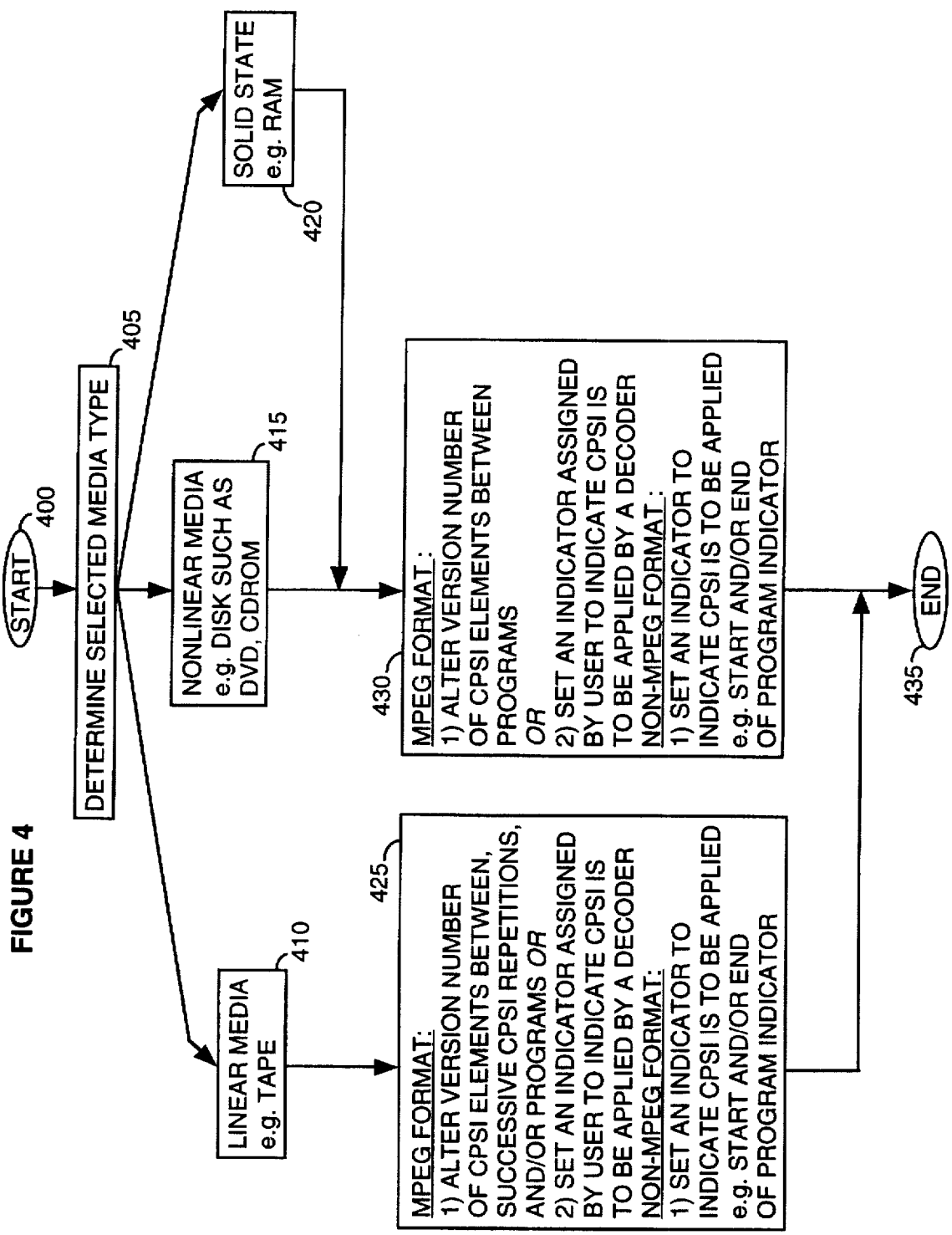

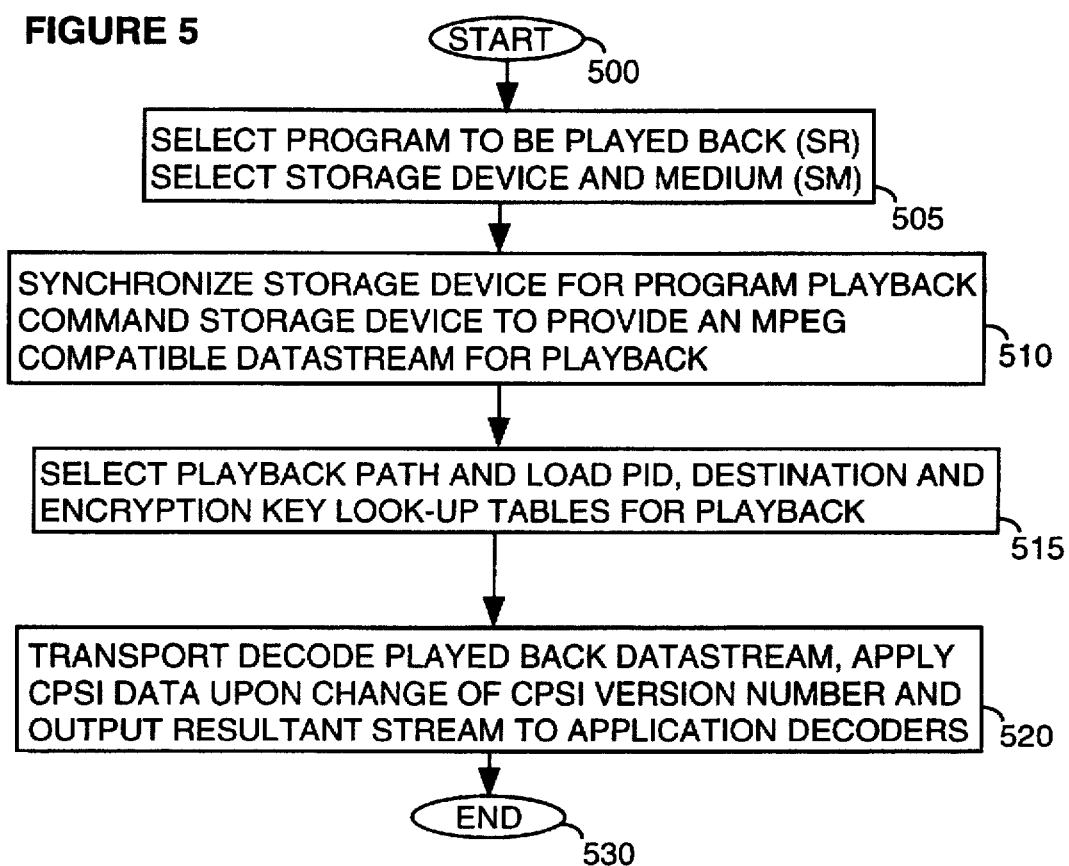

PROCESSING AND STORAGE OF DIGITAL DATA AND PROGRAM SPECIFIC INFORMATION

SPECIFIC INFORMATION

This is a non-provisional application of provisional application Ser. No. 60/018,722 by H. Blatter et al, filed 31st May 1996.

FIELD OF THE INVENTION

This invention is related to the field of digital signal processing, and more particularly to the formation of Program Specific Information used to recover program content and the insertion of the information in digital video data for storage, for example.

BACKGROUND OF THE INVENTION

In video processing and storage applications, digital video data is typically encoded to conform to the requirements of a known standard. One such widely adopted standard is the MPEG2 (Moving Pictures Expert Group) image encoding standard, hereinafter referred to as the "MPEG standard". The MPEG standard is comprised of a system encoding section (ISO/IEC 13818-1, 10th Jun. 1994) and a video encoding section (ISO/IEC 13818-2, 20th Jan. 1995), hereinafter referred to as the "MPEG systems standard" and "MPEG video standard" respectively. Video data encoded to the MPEG standard is in the form of a packetized datastream which typically includes the data content of many program channels (e.g channels 1–125). In order for a decoder to decode the packetized datastream and to recover the video data content of selected program channels for display, for example, the individual packets that comprise the selected program channels must be identified and assembled.

The MPEG standard defines Program Specific Information (PSI) for use in identifying and assembling individual data packets to recover the content of selected program channels. The PSI includes both user definable and mandatory information elements and is defined to include sufficient information for recovery of the data content of all of the program channels that comprise the packetized datastream. Further, the PSI is incorporated in the packetized datastream. This both increases the storage capacity required to store the datastream and reduces the communication bandwidth available for communication of program content. As such, the PSI represents an additional encoding overhead.

The degree of overhead that the PSI imposes is dependent on the quantity of data contained in the PSI (size of the PSI) and the repetition frequency of the PSI within the packetized datastream. At a minimum, the PSI needs to contain sufficient information for recovering the data content of all of the program channels that comprise the packetized datastream. The minimum repetition frequency of the PSI in the packetized datastream is constrained by the desired system operational delay characteristics. For example, a decoder requires updated PSI to implement a change of program channel commanded by a television viewer. Consequently, the minimum PSI repetition frequency is constrained by the willingness of a television viewer to tolerate delay (latency) in response to a change of channel command. These problems are addressed by a system according to the present invention.

SUMMARY OF THE INVENTION

The inventors have hereby recognized that, in some applications, it is desirable to reduce the overhead imposed by the PSI. In a capacity constrained digital storage application, for example, it is advantageous to reduce the size of the PSI stored on the storage media and the number of times the PSI is repeated on the storage media. In other video processing applications, it is desirable to reduce the size of the PSI to permit more frequent repetition of the PSI and so reduce the recovery latency of program content. In addition, the PSI generated should be compatible with the chosen storage media operational characteristics and user requirements.

The inventors have further recognized that it is desirable to store the PSI on the storage media in a format that minimizes the erroneous use of the PSI of one program for the content recovery of a second program requiring different recovery parameters. Such a situation may arise when storage media is used to store programs derived from different packetized datastreams, e.g. when storage media is partially overwritten with a program derived from a different datastream. Ideally, the PSI storage format would also reduce program recovery latency and minimize random access data recovery times. Rapid random access is particularly important in those storage device operations that involve fast play or content skipping (trick play), such as in a VCR, for example.

In accordance with the principles of the present invention, a video processing system reduces the processing and storage overhead imposed by Program Specific Information (PSI) used for program content recovery. A disclosed system provides condensed PSI and adaptively inserts the condensed PSI in a packetized datastream to provide reduced processing and storage overhead. The system adaptively generates PSI for various media types e.g. video tape, digital video disc (DVD) or CDROM. In addition, storage media formats and packetized datastream formats are disclosed that provide increased data processing efficiency using the condensed PSI. The disclosed storage and datastream formats provide reduced program recovery latency and minimize the use of incorrect PSI parameters across program boundaries.

A method for generating a program representative packetized datastream from an input packetized datastream representing a plurality of programs involves selecting a desired program from the plurality of programs. Program content packets comprising the selected program are identified. Condensed program specific information (CPSI) suitable for use in identifying and assembling the identified packets is formed. The resulting CPSI and the identified packets are formed into a datastream.

A method for processing a program representative packetized datastream that incorporates program specific information (PSI) for identifying and assembling program content packets is also disclosed. The method involves selecting the program representative datastream from an input datastream representing a plurality of programs. Program content packets comprising the selected program, and PSI packets associated with the selected program, are both identified. The identified PSI packets and the identified program content packets are both extracted from the packetized datastream. The PSI packets and the program content packets are stored on a storage medium.

BRIEF DESCRIPTION OF THE DRAWINGS

In the drawing:

FIG. 4 shows a flowchart for a process to format the CPSI to ensure that the correct CPSI is applied during program decoding.

FIG. 5 shows a flowchart for a process to recover selected programs from a selected storage device.

DETAILED DESCRIPTION OF THE DRAWINGS

Figure 1:
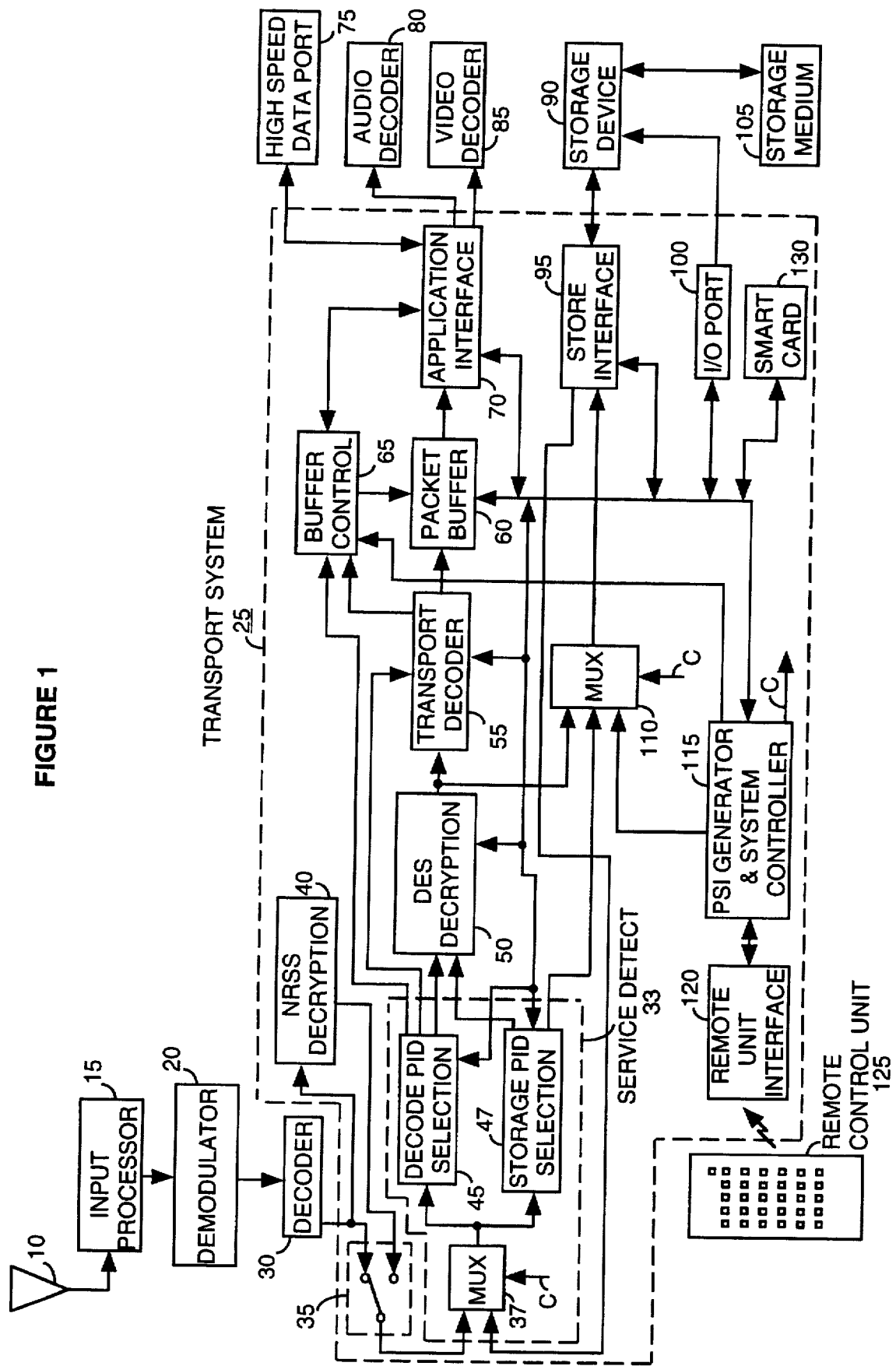
FIG. 1 shows a video receiver system, according to the invention, for adaptively generating and inserting condensed PSI in a packetized datastream for storage in various types of media.

FIG. 1 shows a video receiver system, according to the invention, for adaptively generating and inserting condensed PSI in a packetized datastream that is to be stored, for example. The receiver system adaptively generates PSI for various media types e.g. video tape, digital video disc (DVD) or CDROM. In addition, the video receiver system reduces the processing and storage overhead imposed by Program Specific Information (PSI) used for program content recovery.

Although the disclosed system is described in the context of an MPEG compatible system for receiving MPEG encoded transport streams representing broadcast programs, it is exemplary only. The principles of the invention may also be applied to other types of system including non-MPEG compatible systems, involving other types of encoded datastreams. For example, the invention principles may be applied to digital video disc (DVD) systems and MPEG program streams. Further, although the disclosed system is described as processing broadcast programs, this is exemplary only. The term 'program' is used to represent any form of packetized data such as telephone messages, computer programs, internet data or other communications, for example.

In overview, in the video receiver system of FIG. 1, a carrier modulated with video data is received by antenna 10 and processed by unit 15. The resultant digital output signal is demodulated by demodulator 20 and decoded by decoder 30. The output from decoder 30 is processed by transport system 25 which is responsive to commands from remote control unit 125. System 25 provides compressed data outputs for storage, further decoding, or communication to other devices. A video receiver user selects the program he wishes to view, the programs he wishes to store, the type of storage media and manner of storage by on-screen menu selection using remote control unit 125. Video and audio decoders 85 and 80 respectively, decode the compressed data from system 25 to provide outputs for display. Data port 75 provides an interface for communication of the compressed data from system 25 to other devices such as a computer or High Definition Television (HDTV) receiver, for example. Storage device 90 stores the compressed data from system 25 on storage medium 105. Device 90, in a playback mode also supports retrieval of the compressed data from storage medium 105 for processing by system 25 for decoding, communication to other devices or storage on a different storage medium (not shown to simplify drawing).

Considering FIG. 1 in detail, a carrier modulated with video data received by antenna 10, is converted to digital form and processed by input processor 15. Processor 15 includes radio frequency (RF) tuner and intermediate frequency (IF) mixer and amplification stages for down-converting the input video signal to a lower frequency band suitable for further processing. The resultant digital output signal is demodulated by demodulator 20 and decoded by decoder 30. The output from decoder 30 is further processed by transport system 25.

Multiplexer (mux) 37 of service detector 33 is provided, via selector 35, with either the output from decoder 30, or the decoder 30 output further processed by NRSS (National Renewable Standards Committee) descrambling unit 40. Selector 35 detects the presence of an insertable, NRSS compatible, descrambling card and provides the output of unit 40 to mux 37 only if the card is currently inserted in the video receiver unit (the NRSS removable conditional access system is defined in EIA Draft Document IS-679, Project PN-3639). Otherwise selector 35 provides the output from decoder 30 to mux 37. The presence of 30 the insertable card permits unit 40 to descramble additional premium program channels, for example, and provide additional program services to a viewer. It should be noted that in the preferred embodiment NRSS unit 40 and smart card unit 130 (smart card unit 130 is discussed later) share the same system 25 interface such that only either an NRSS card or a smart card may be inserted at any one time. However, the interfaces may also be separate to allow parallel operation.

The data provided to mux 37 from selector is in the form of an MPEG compliant packetized transport datastream as defined in MPEG systems standard section 2.4 and includes the data content of one or more program channels. The individual packets that comprise particular program channels are identified by Packet Identifiers (PIDs). The transport stream contains Program Specific Information (PSI) for use in identifying the PIDs and assembling individual data packets to recover the content of all the program channels that comprise the packetized datastream. A video receiver user selects the program he wishes to view, the programs he wishes to store and the media to be used for storage by on-screen menu selection using remote control unit 125. System controller 115 uses the selection information, provided via interface 120, to configure system 25 to select the programs for storage and display and to generate PSI suitable for the selected storage device and media. Controller 115 configures system 25 elements 45, 47, 50, 55, 65 and 95 by setting control register values within these elements via a data bus and by selecting signal paths via muxes 37 and 110 with control signal C.

In response to control signal C, mux 37 selects either, the transport stream from unit 35, or in a playback mode, a datastream retrieved from storage device 90 via store interface 95. In normal, non-playback operation, the data packets comprising the program that the user selected to view are identified by their PIDs by selection unit 45. If an encryption indicator in the header data of the selected program packets indicates the packets are encrypted, unit 45 provides the packets to decryption unit 50. Otherwise unit 45 provides non-encrypted packets to transport decoder 55. Similarly, the data packets comprising the programs that the user selected for storage are identified by their PIDs by selection unit 47. Unit 47 provides encrypted packets to decryption unit 50 or non-encrypted packets to mux 110 based on the packet header encryption indicator information.

Units 45 and 47 employ PID detection filters that match the PIDs of incoming packets provided by mux 37 with PID values pre-loaded in control registers within units 45 and 47 by controller 115. The pre-loaded PIDs are used in units 47 and 45 to identify the data packets that are to be stored and the data packets that are to be decoded for use in providing a video image. The pre-loaded PIDs are stored in look-up tables in units 45 and 47. The PID look-up tables are memory mapped to encryption key tables in units 45 and 47 that associate encryption keys with each pre-loaded PID. The memory mapped PID and encryption key look-up tables permit units 45 and 47 to match encrypted packets containing a pre-loaded PID with associated encryption keys that permit their decryption. Non-encrypted packets do not have associated encryption keys. Units 45 and 47 provide both identified packets and their associated encryption keys to decryptor 50. The PID look-up table in unit 45 is also memory mapped to a destination table that matches packets containing pre-loaded PIDs with corresponding destination buffer locations in packet buffer 60. The encryption keys and destination buffer location addresses associated with the programs selected by a user for viewing or storage are pre-loaded into units 45 and 47 along with the assigned PIDs by controller 115. The encryption keys are generated by ISO 7816-3 compliant smart card system 130 from encryption codes extracted from the input datastream. The generation of the encryption keys is subject to customer entitlement determined from coded information pre-stored on the insertable smart card itself (International Standards Organization document ISO 7816-3 of 1989 defines the interface and signal structures for a smart card system).

The packets provided by units 45 and 47 to unit 50 are encrypted according to the Data Encryption Standard (DES) defined in Federal Information Standards (FIPS) Publications 46, 74 and 81 provided by the National Technical Information Service, Department of Commerce. Unit 50 decrypts the encrypted packets using corresponding encryption keys provided by units 45 and 47 by applying known techniques. The decrypted packets from unit 50 and the non-encrypted packets from unit 45 that comprise the program for display are provided to decoder 55. The decrypted packets from unit 50 and the non-encrypted packets from unit 47 that comprise the program for storage are provided to mux 110.

Unit 60 contains four packet buffers accessible by controller 115. One of the buffers is assigned to hold data destined for use by controller 115 and the other three buffers are assigned to hold packets that are destined for use by application devices 75, 80 and 85. Access to the packets stored in the four buffers within unit 60 by both controller 115 and by application interface 70 is controlled by buffer control unit 65. Unit 45 provides a destination flag to unit 65 for each packet identified by unit 45 for decoding. The flags indicate the individual unit 60 destination locations for the identified packets and are stored by control unit 65 in an internal memory table. Control unit 65 determines a series of read and write pointers associated with packets stored in buffer 60 based on the First-In-First-Out (FIFO) principle. The write pointers in conjunction with the destination flags permit sequential storage of an identified packet from units 45 or 50 in the next empty location within the appropriate destination buffer in unit 60. The read pointers permit sequential reading of packets from the appropriate unit 60 destination buffers by controller 115 and application interface 70.

The non-encrypted and decrypted packets provided by units 45 and 50 to decoder 55 contain a transport header as defined by section 2.4.3.2 of the MPEG systems standard. Decoder 55 determines from the transport header whether the non-encrypted and decrypted packets contain an adaptation field (per the MPEG systems standard). The adaptation field contains timing information including, for example, Program Clock References (PCRs) that permit synchronization and decoding of content packets. Upon detection of a timing information packet, that is a packet containing an adaptation field, decoder 55 signals controller 115, via an interrupt mechanism by setting a system interrupt, that the packet has been received. In addition, decoder 55 changes the timing packet destination flag in unit 65 and provides the packet to unit 60. By changing the unit 65 destination flag, unit 65 diverts the timing information packet provided by decoder 55 to the unit 60 buffer location assigned to hold data for use by controller 115, instead of an application buffer location.

Upon receiving the system interrupt set by decoder 55, controller 115 reads the timing information and PCR value and stores it in internal memory. PCR values of successive timing information packets are used by controller 115 to adjust the system 25 master clock (27 MHz). The difference between PCR based and master clock based estimates of the time interval between the receipt of successive timing packets, generated by controller 115, is used to adjust the system 25 master clock. Controller 115 achieves this by applying the derived time estimate difference to adjust the input control voltage of a voltage controlled oscillator used to generate the master clock. Controller 115 resets the system interrupt after storing the timing information in internal memory.

Packets received by decoder 55 from units 45 and 50 that contain program content including audio, video, caption, and other information, are directed by unit 65 from decoder 55 to the designated application device buffers in packet buffer 60. Application control unit 70 sequentially retrieves the audio, video, caption and other data from the designated buffers in buffer 60 and provides the data to corresponding application devices 75, 80 and 85. The application devices comprise audio and video decoders 80 and 85 and high speed data port 75. Data port 75 may be used to provide high speed data such as computer programs, for example to a computer. Alternatively port 75 may be used to output data to an HDTV decoder, for example.

Packets that contain PSI information are recognized by unit 45 as destined for the controller 115 buffer in unit 60. The PSI packets are directed to this buffer by unit 65 via units 45, 50 and 55 in a similar manner to that described for packets containing program content. Controller 115 reads the PSI from unit 60 and stores it in internal memory.

Figure 2:
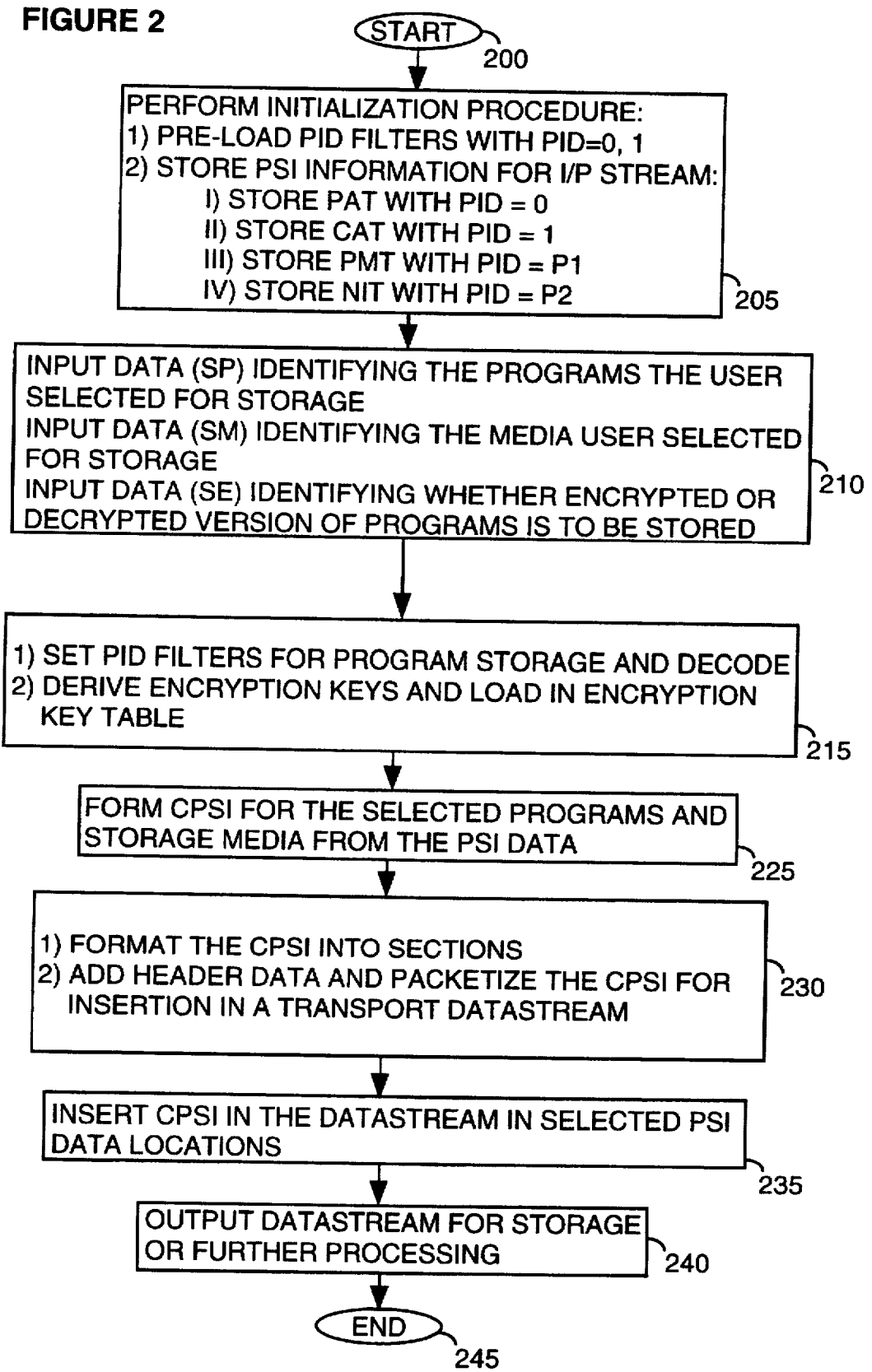
FIG. 2 shows a flowchart for a process to generate Condensed Program Specific Information (CPSI) from PSI and to incorporate the CPSI in a packetized datastream suitable for storage on a selectable storage medium.

Controller 115 employs the process of FIG. 2 both to generate condensed PSI (CPSI) from this stored PSI and to incorporate the CPSI in a packetized datastream suitable for storage on a selectable storage medium. The packet identification and direction process of FIG. 2 is governed by controller 115 in conjunction with the unit 45 and unit 47 PID, destination and encryption key look-up tables and control unit 65 functions in the manner previously described.

The CPSI contains information related to the particular program to be stored, whereas the PSI contains information related to all the programs in the datastream input to system 25. Consequently, the CPSI takes up less storage capacity and imposes less overhead than the PSI. In addition, given a fixed overhead constraint, the CPSI may be repeated in a datastream more frequently than the PSI and so may be derived and applied to reduce the recovery latency of program content.

The PSI as defined in MPEG systems standard section 2.4.4 comprises four non-encrypted elements or tables of information. These are the Program Association Table (PAT), the Program Map Table (PMT), the Network Information Table (NIT) and the Conditional Access Table (CAT). Each table is formed from data packets that are recognized by a particular PID. The PMT defines the PID labels that identify the individual packetized datastreams that constitute a program. These individual streams are termed elementary streams in the MPEG standard. Elementary streams include datastreams such as video, audio for various languages and caption datastreams. The PAT associates a program number with the PIDs that permit identification and assembly of the packets comprising the PMT. The NIT is optional and may be structured and used to define physical network parameters such as satellite transmission channel frequencies and transponder channels, for example. The CAT contains the conditional access information such as encryption codes that govern access to programs that are dependent upon user entitlement.

In step 205 of FIG. 2, controller 115 (FIG. 1) performs an initialization procedure at system power-up following the start at step 200. In step 205, controller 115 loads the unit 45 (FIG. 1) PID detection filters with the MPEG defined PID values for the PAT and CAT tables (PIDs hex value 0000 and hex value 0001 respectively). In addition, controller 115 pre-assigns the PAT and CAT packets to the controller buffer in unit 60 by updating the unit 45 destination table. The PAT and CAT packets detected by unit 45 are steered via decoder 55 to the controller buffer in unit 60 under control of unit 65. In step 205, control unit 65 signals controller 115 via a PSI interrupt that PSI packets are present in unit 60. Controller 115, upon receipt of the PSI interrupt, repetitively accesses the packets stored in its designated unit 60 buffer and stores the complete CAT and PAT data in internal memory. Controller 115 repeats this process to store complete PMT and NIT data in internal memory after determining the PIDs that identify the PMT and NIT packets from the PAT. Controller 115 continuously accesses buffer 60 and captures PSI packets in internal memory upon receipt of PSI interrupts while the receiver is powered on. As a result, controller 115 captures in its internal memory the PAT, PMT, NIT and CAT data that comprises the full PSI of the transport datastream input to system 25.

In step 210 of FIG. 2, user generated data (SP, SM, SE) identifying the programs a user wishes to store, as well as those programs that are to be stored in encrypted form, and the media and device to be used for storage, is input to controller 115 (FIG. 1). The user selection data is input to controller 115 via interface 120 following on-screen menu selection with remote control unit 125. In step 215, in response to the input selection data (SP), controller 115 derives the PIDs for the selected programs for storage from the stored PSI. The unit 47 detection filters are loaded with the PIDs of the programs to be stored by controller 115. This enables unit 47 to identify the packets comprising the selected programs for storage.

In step 215 of FIG. 2, unit 47 (FIG. 1) provides non-encrypted packets to mux 110 and provides encrypted packets (identified by an encryption indicator in the packet header data) along with associated encryption keys to decryption unit 50. The encryption keys are provided to unit 47 by controller 115 in step 215 of FIG. 2, following their generation by smart card 130 (FIG. 1) from encryption codes obtained from the CAT for the selected programs (SP) in the manner previously described. However, if selection data SE requests encrypted storage, unit 47 passes the encrypted packets to be stored to mux 110. Consequently, in step 215 of FIG. 2, the packets comprising the programs to be stored (SP) are provided to mux 110 either in encrypted or decrypted form in response to selection data SE. Controller 115, in step 225, forms condensed program specific information (CPSI) for the programs selected for storage (SP) from the full program specific information (PSI) captured from the transport datastream input to system 25. Controller 115 forms CPSI for each program to be stored in step 225 of FIG. 2 by employing the process shown in FIG. 3.

Figure 3:
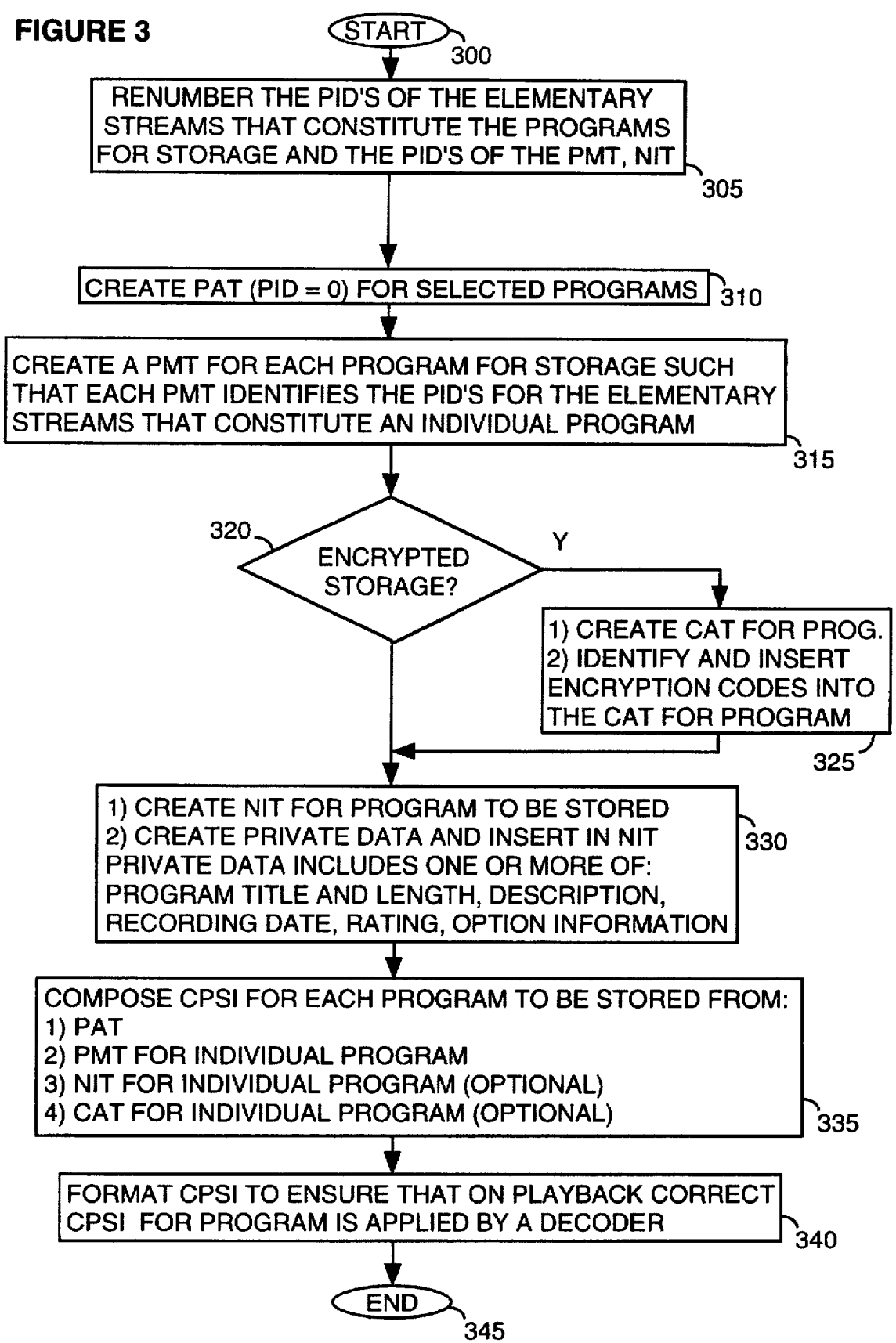
FIG. 3 shows a flowchart for a process to form CPSI for storage of selected programs on a selected storage medium.

In step 305 of FIG. 3, following the start at step 300, controller 115 renumbers the PID values of the elementary streams that constitute the programs to be stored as well as the PIDs that identify the PMT and NIT. Except in the case of a chance coincidence, the renumbered PID values are different from the corresponding PID values recovered in the PSI of the transport datastream input to system 25. The renumbered PIDs are determined by assigning a fixed (base) PID to identify the PMT and by adding predetermined offset values to the base PID to determine the PID values for the video, audio, caption, PCR and NIT. An exemplary PID allocation scheme for two programs to be stored (program 1 and program 2) is shown in Table I.

As can been seen from Table I, corresponding elementary streams for the two programs are given the same PID e.g. the video streams for programs 1 and 2 are both identified by PID=0401. Allocation of the same PID values to corresponding elementary streams simplifies the data retrieval and recovery process performed by a decoder or playback device. A decoder may directly identify streams without the need to first capture and assemble PID de-mapping data. However, renumbering the PIDs in this way introduces potential PID ambiguity and requires that the renumbered elementary streams belonging to individual programs are not intermingled. Otherwise, the intermingling of elementary streams, which share the same PID, and belong to different programs, may result in erroneous program assembly. Consequently, the PID renumbering of step 305 is employed in applications in which groups of elementary streams belonging to individual programs are separately identifiable. Such applications include datastream generation and tape storage where the elementary streams of individual programs are not intermingled. Such applications also include disk storage applications in which disk storage information is available to separate the groups of elementary streams belonging to individual programs.

Alternatively, other PID allocation schemes that avoid potential PID ambiguity may be used. For example, the base PID value may be allocated to identify particular programs separately as proposed for high definition television (HDTV) signal decoding in section 8.4.7.1 of the *Digital Television Standard for HDTV Transmission* of Apr. 12 1995, prepared by the United States Advanced Television Systems Committee (ATSC). Alternatively, the PID values of the elementary streams that constitute the programs may be stored as transmitted without them being renumbered. Such a scheme is straightforward to implement but does not simplify the data retrieval process. Note the PIDs identifying the PAT and CAT are 0000 and 0001 (in hex) respectively as defined in the MPEG standard.

TABLE I

| PID name | PID Definition base + offset (Hex) | Description |
| --- | --- | --- |
| Program 1 | | |
| PMT | 0400 | PID for program map table - base PID |
| Video | 0401 | PID for program video stream |
| PCR | 0401 | PCR in video stream |
| Audio1 | 0406 | PID for first program audio stream |
| Audio2 | 0407 | PID for second program audio stream |
| Data | 040B | PID for program caption stream |

TABLE I-continued

| PID name | PID Definition base + offset (Hex) | Description |
|---|---|---|
| NIT Program 2 | 040E | PID for program Network Information Table |
| PMT | 0400 | PID for program map table - base PID |
| Video | 0401 | PID for program video stream |
| PCR | 0401 | PCR in video stream |
| Audio1 | 0406 | PID for first program audio stream |
| Audio2 | 0407 | PID for second program audio stream |
| Data | 040B | PID for program caption stream |
| NIT | 040E | PID for program Network Information Table |

In step 310 of FIG. 3, controller 115 creates a program association table (PAT) with a PID value (in hex) equal to 0000. The PAT is advantageously created only for the individual program currently being stored and a new PAT is created for each program stored. Therefore, the PAT contains only entries that are required for the identification of a single program map table (PMT). In the exemplary programs shown in Table I, the CPSI of both program 1 and program 2 would contain a PAT with a PID entry (0400) identifying a single PMT. Alternatively, the PAT may be formed to contain entries for the identification of a PMT either for all the programs the user has selected to be stored or all the programs the user has selected to be stored plus those previously stored on the storage medium. In order to create the latter type of PAT, controller 115 recovers the PIDs of pre-recorded PMTs from storage medium 105 via interface 95 and device 90 prior to creating the PAT. If an NIT is created, as discussed later, the PID permitting identification of NIT packets is also included in the PAT.

In step 315, controller 115 creates a PMT for each program to be stored using the predetermined renumbered PID values to identify the component elementary streams. The elementary streams that comprise the individual programs to be stored are determined by controller 115 from the previously stored PSI data. In step 320, controller 115 determines from the user input data SE provided via interface unit 120 (FIG. 1) whether or not individual programs are to be stored in encrypted form. If a program is to be stored in non-encrypted form controller 115 continues execution from step 330 of FIG. 3 and does not create a conditional access table (CAT). If the SE data requests encrypted storage of a program, controller 115, in step 325, creates a CAT for the program that incorporates an encryption code. The stored encryption code is recovered in a subsequent program retrieval operation and is used to generate an encryption key permitting decryption of the encrypted program for display, for example. The encryption key may only be generated from the recovered code if permitted by entitlement data pre-stored on an insertable smart card in the manner previously discussed.

The described encryption system is exemplary only. Alternative encryption mechanisms may be employed that involve the storage of different encryption codes or keys for decryption. Other entitlement mechanisms that do not involve the storage of codes do not necessarily require a CAT. In addition, the encryption codes may be incorporated into information tables of the CPSI other than a CAT thereby dispensing with the need for a CAT. For example, the encryption codes may be incorporated into the CA_descriptor private data section of the PMT (per the MPEG systems standard section 2.6.16). This approach has the advantage of associating the codes directly with elementary streams that constitute programs, avoiding the need for a separate directory to link the elementary streams to the codes.

Following step 325 or 320, controller 115, in step 330, creates a network information table (NIT) for each program to be stored. The NIT created by controller 115 includes private data which may include, for example, a title, duration and description of the program as well as a violence/sex content rating and a time and date at which it is recorded plus additional optional information such as whether edited versions are selectable by the user. The stored private data is collated by controller 115 from the previously stored PSI information or additionally, from data entered by the user via remote control unit 125 and interface 120. The NIT is optional and a user may choose to omit the NIT for any or all programs to be stored via menu selection in which case step 330 of FIG. 3 is bypassed.

In addition, the private data may be incorporated into information tables of the CPSI other than an NIT. For example, the private data may be incorporated into the User Private descriptor parts of the PMT (per the MPEG systems standard section 2.6). This approach has the advantage of associating the private data directly with elementary streams that constitute programs, avoiding the need for a separate directory to link the elementary streams to the private data.

In step 335, controller 115 assembles the PAT and PMT created for individual programs to form the condensed program specific information (CPSI) for each program. Controller 115 additionally assembles and incorporates in the CPSI the optional CAT and NIT data created for each program. The CPSI therefore comprises a PAT and a PMT and may also include either or both a CAT and NIT. As created, the CPSI contains information related to the particular programs selected for storage from the datastream input to system 25 and excludes program specific information related to those programs not selected for storage.

Alternatively, however the CPSI may be created for more than one program selected for storage from the input transport datastream. In which case the CPSI would include a single PAT and PMT and may include a single CAT and a single NIT. In this case these tables contain data supporting the identification and recovery of the plurality of programs selected for storage, as defined in the MPEG standard. In the case where programs are selected for storage from two separate transport datastreams input to system 25, for example, the CPSI would contain a single PAT and two PMTs. One PMT for each program to be stored. The CPSI may also include a single CAT and two NITs. One NIT for each program to be stored.

In recovering a program from a storage medium, a problem occurs if a playback device incorrectly applies the CPSI of a different program. The use of the incorrect CPSI data such as the PMT, may result in erroneous identification and assembly of data packets in the recovery of the program content and produce invalid data for display or processing, for example. This problem may arise, for instance, if a playback device does not apply the CPSI of the recovered program or does not recognize that the CPSI has changed and continues to apply the CPSI previously derived for a different program. The likelihood that this may occur is increased if the storage medium contains more than one program. In that case a playback device may cross program boundaries during a trick play or search operation, for example, and continue to apply the CPSI of the previous program. In order to alleviate the problem of applying incorrect CPSI parameters across program boundaries, controller 115 formats the CPSI in step 340 by employing the process of FIG. 4.

In step 405 of FIG. 4, following the start at step 400, controller 115 determines the type of storage device and medium selected by the user from input data (SM) provided via interface 120. If the selected medium is of linear type i.e. a sequential access medium such as video tape used for digital VHS (DVHS) recording, for example, controller 115 is directed to perform step 425 following step 410. In step 425, controller 115 alters the version number that is associated with the PAT, PMT, CAT and NIT packet format according to the MPEG syntax (MPEG systems standard section 2.4.4–2.4.4.11). The version number is altered by incrementing the version number continuously between successive repetitions of the CPSI in the program to be stored. The version number counters are incremented continuously through any overflow condition. Upon retrieval of the program from storage medium 105, a decoder or playback device detects changes in successive version numbers and applies the PAT, PMT, CAT and NIT information upon their every occurrence in the retrieved program.

Alternative methods of altering the version numbers in order to initiate a decoder to re-acquire the CPSI may also be employed. The version numbers may be incremented between the first two successive occurrences of the CPSI at the beginning of the program recording or between selected CPSI occurrences within the program or between different programs on storage medium 105, for example. In addition, the version numbers occurring at program boundaries between different programs need not differ by any particular number. However, within a program, successive version numbers that are created should differ by one to be MPEG compliant. In non-MPEG compliant applications the CPSI table version numbers may differ by any value within a program. Another method that may be employed in step 425 is to designate a separate indicator to be used to command a playback device to apply the CPSI at every CPSI occurrence or upon selected occurrences. The indicator assigned would be compatible with the MPEG syntax and be located in a private data section such as within the adaptation field of the PAT or CAT, for example (section 2.4.3.4 of the MPEG systems standard). The indicator may be arbitrarily defined or may be an existing indicator such as the 'discontinuity indicator' in the packet header adaptation field (defined in section 2.4.3.5 of the MPEG systems standard). The discontinuity indicator is set to a '1' to indicate to a decoder or playback device that there is a potential discontinuity in CPSI and therefore the next occurrence of PAT, PMT, CAT and NIT information is to be applied. Such use of the discontinuity indicator is not contemplated by the MPEG standard.

In the context of a non-MPEG compatible datastream additional methods are also available including designating a non-MPEG compatible indicator or using a signal to indicate start or end of a program recording, for example. Another technique is to configure a playback device to identify and apply every occurrence of the CPSI in a retrieved datastream regardless of version number. In which case step 425 may be bypassed.

If the selected storage medium 105 is of nonlinear type i.e. a medium that accommodates non-sequential access such as a disc medium including CDROM or DVD, for example, controller 115 is directed to perform step 430 following step 415. In a nonlinear type medium the CPSI data may be stored either, in one or more particular directory locations on the medium, or within the program content as with the linear type medium. In step 430, in the case where the CPSI is stored in directory locations, controller 115 alters the version numbers that are associated with the PAT, PMT, CAT and NIT packets in the directory locations. The version numbers are incremented consistent with the MPEG syntax to ensure that they are different between different programs on storage medium 105 (FIG. 1). In step 430, in the case where the CPSI is stored within the program content, controller 115 alters the version numbers as described for step 425 for a linear type medium. In order to ensure that the CPSI element version numbers differ between different programs, controller 115 recovers the version numbers of pre-recorded programs or files from storage medium 105 via interface 95 and device 90, prior to creating and inserting incremented version numbers in the CPSI data.

Other methods of altering the version numbers in step 430 may also be employed. However, the CPSI version numbers should differ between different programs stored on medium 105. Alternatively, a separate indicator may be designated in step 430 to command a decoder to apply the CPSI either upon start of a program or upon traversing a program boundary. The indicator assigned would be compatible with the MPEG syntax and be located in a private data section such as the adaptation field of the PAT or CAT, for example (section 2.4.3.4 of the MPEG systems standard). The indicator may be arbitrarily defined or may be an existing indicator such as the 'discontinuity indicator' in the packet header adaptation field as described in connection with step 425. In the context of a non-MPEG compatible datastream, an indicator may be designated to command a decoder or playback device to apply the CPSI. This indicator may denote the start or end of a program recording, for example.

If the selected storage medium 105 is solid state i.e. a semiconductor memory such as a RAM, controller 115 is directed to perform step 430 following step 420. In a solid state type medium as with a nonlinear medium the CPSI data is typically stored in one or more particular directory locations on the medium and is readily accessible from other storage locations. Consequently, controller 115 alleviates the problem of applying incorrect CPSI parameters across program boundaries by formatting the CPSI for a solid state medium as it does for a nonlinear medium. That is controller 115 uses the process of step 430.

The process of FIG. 4 terminates at step 435 following steps 425 or 430 which in turn completes the CPSI formatting of step 340 of FIG. 3. The process of FIG. 3 terminates at step 345 following step 340 which completes the formation of the CPSI for the programs selected for storage of encompassing step 225 of FIG. 2. Controller 115 continues the process of FIG. 2 with execution of step 230.

In step 230, controller 115 forms the CPSI data into sections in accordance with the MPEG syntax (paragraphs 2.4.4.3–2.4.4.11 of the MPEG systems standard). Sections are formed for the PAT data and PMT data. Sections are also formed for the optional CAT and NIT (private data) if these tables are incorporated in the CPSI in the previously described process of FIG. 3. The resultant packetized data includes table identifiers, section length identifiers and the version numbers previously determined in the process of FIG. 4. It is to be noted that the PAT section also includes a transport stream identifier that associates the PAT to a particular transport stream. Controller 115 obtains this identifier from the original PSI data and inserts it in the transport stream identifier field of the PAT section of the CPSI. However, this field may optionally be left unaltered or blank.

In step 230, controller 115 adds header data to the CPSI data sections to format and packetize the CPSI data for insertion into the datastream to be stored. Controller 115 creates the headers in accordance with sections 2.4.3.2 and 2.4.3.3 of the MPEG systems standard from the PSI header data stored in the controller 115 internal memory. However, CPSI section data is different in length to corresponding PSI section data. Therefore, new header parameters including the 'continuity count' indicator and 'payload unit start indicator' are created by controller 115 and inserted in the respective indicator fields within the header data. The new continuity count indicator created by controller 115 reflects, for example, the number of packets per PID for the CPSI elements instead of the different number of packets per PID of the corresponding PSI elements. The new payload unit start indicator created by controller 115 identifies, for example, the first byte of the CPSI section instead of the first byte of the corresponding PSI section.

Continuing with FIG. 2, in step 235, the CPSI in the form of packetized MPEG compatible section data formed in step 230 is provided by controller 115 to mux 110 (FIG. 1). Program content packet datastreams from unit 47 or unit 50 as previously discussed in connection with step 215, are also provided to mux 110. In step 235, controller 115 multiplexes between the program content and CPSI datastreams input to mux 110 using path select signal C to create a composite datastream that is output by mux 110 to storage interface 95. The composite datastream comprises program content packets and CPSI packets. Controller 115 synchronizes insertion of the CPSI packets into the program datastream to be stored, in response to a PSI interrupt signal from control unit 65 (FIG. 1). The PSI interrupt indicates the presence of PSI packets in buffer 60 as discussed in connection with step 205. In this manner, the packetized PAT, PMT, CAT and NIT sections of the CPSI are inserted into PSI locations to replace the corresponding sections of the PSI. The non-encrypted CPSI data is insertable in either the encrypted or non-encrypted program content datastreams that are input to mux 110 in order to create either encrypted or non-encrypted programs for storage.

Controller 115, in step 235, replaces each occurrence of PSI data in the datastream to be stored with corresponding CPSI data irrespective of the type of medium the user has selected for storage. However, additional reduction in coding overhead may be achieved by inserting the CPSI in selected PSI locations or by inserting the CPSI only once within the program to be stored. The frequency of repetition of the CPSI within the program to be stored may be determined by controller 115 based on factors that include, for example, minimum PSI element repetition frequency constraints, user preference, data storage capacity constraints or the selected storage medium type. The system proposed for high definition television (HDTV) by the ATSC specifies a minimum repetition frequency for certain PSI elements, including a minimum interval of 100 ms between repetitions of the PAT, for example, (Digital Television Standard for HDTV Transmission, Annex C, section 5.4, of Apr. 12 1995). Further, in nonlinear or solid state type storage media, for example, reducing the number of repetitions of the CPSI or inserting the CPSI only once in a program to be stored, does not adversely affect program recovery latency. This is because these types of media permit rapid non-sequential (random) data access.

In step 240, store interface 95 receives the programs to be stored in the form of the packetized datastream incorporating the CPSI (hereinafter termed the CPSI stream) from mux 110. The process of FIG. 2 used by controller 115 to generate the CPSI stream terminates at step 245. It should be noted that the CPSI stream may alternatively be provided to other applications in step 240 such as display or communication via interface 70 instead of storage via interface 95.

The CPSI stream from mux 110 is buffered by interface 95 to reduce gaps and bit rate variation in the data. The resultant buffered data is processed by storage device 90 to be suitable for storage on medium 105. Controller 115 initiates and controls the operation of storage device 90 (FIG. 1) by command via I/O port 100 using a standardized CEBus control protocol (Home Automation Standard (CEBus), EIA/IS-60, December 1989). Storage device 90 is a linear storage medium DVHS type device that encodes the buffered datastream from interface 95 using known error encoding techniques such as channel coding, interleaving and Reed Solomon encoding to produce an encoded datastream suitable for storage. Unit 90 stores the resultant encoded datastream incorporating the CPSI on tape medium 105.

Other tape storage systems permit the recording of two datastreams in parallel. The first datastream, typically containing the majority of the program content, is conventionally helically stored on the tape. A second datastream, typically of much lower data density and bit rate, is stored in parallel, in linear (non-helical) form on an auxiliary track located towards the tape edge. In this type of storage system, device 90 separates the CPSI data from the CPSI stream and advantageously stores the CPSI data on the auxiliary track. Unit 90 stores the CPSI data in such a manner that each program recorded on the tape carries its associated CPSI data in the auxiliary track in parallel with the program content. The frequency of repetition of the CPSI data in the auxiliary track may be adjusted subject to auxiliary track data rate constraints. Alternatively, the CPSI may be stored in helical auxiliary tracks or in data management areas including track information areas (TIAs) and insert and track information sectors (ITI sectors). The data management areas are stored in helical or non-helical tracks paralleling the program content.

Although described as a DVHS device that stores data on a linear type storage medium in the exemplary embodiment of FIG. 1, storage unit 90 may be any type of storage unit. For example, unit 90 may be a solid state or nonlinear type device for storing data in RAM or on a DVD or CDROM. If unit 90 and medium 105 are nonlinear or solid state type storage systems, unit 90 separates the CPSI data from the CPSI stream and stores the CPSI data in a designated directory section of the medium. This advantageously avoids repeated storage of the CPSI and reduces the required storage capacity. Alternatively, unit 90 may store the CPSI stream as formed and input to unit 90, incorporating one or more repetitions of the CPSI data.

Further, system 25 of FIG. 1 may incorporate a plurality of storage/retrieval paths that support the operation of a plurality of storage devices of various types including linear, nonlinear and solid state types. The single storage/retrieval path shown in FIG. 1 comprises units 47, 90, 95, 105 and 110, as described. By replicating these elements to create parallel storage functions, system 25 is readily extended to incorporate a plurality of storage paths. The storage path and programs destined for a particular storage device are selected by user generated data (SP, SM) input to controller 115 via interface 120 following on-screen menu selection with remote control unit 125, as previously described.

System 25 of FIG. 1 recovers programs from storage device 90 and medium 105 in a playback mode using the process of FIG. 5. The recovered datastreams are processed by system 25 and provided to application devices 75, 80 and 85 for display or output, for example. Alternatively, the program datastreams may be stored on other parallel storage devices (not shown in FIG. 1 to simplify the drawing).

In step 505 of FIG. 5, following the start at step 500, user generated data (SR, SM) is input to controller 115 of system 25 (FIG. 1) identifying the programs to be recovered and the storage device from which the programs are to be recovered. The user selection data is input to controller 115 via interface 120 following on-screen menu selection with remote control unit 125. It is assumed for exemplary purposes that the user selects programs to be recovered from storage device 90 (FIG. 1). Controller 115, in step 510, initiates recovery of the selected program datastreams by device 90 from medium 105 by command via I/O port 100 using the standardized CEBus control protocol as previously discussed. Device 90 decodes the error encoded data retrieved from medium 105 to recover the corresponding data originally provided to device 90 for storage. Device 90 may be a DVHS linear type storage unit or another type of storage unit such as a solid state RAM or nonlinear type DVD or CDROM type device. The recovered decoded datastreams are transferred, in step 510, by device 90 to interface 95. This data transfer is controlled and synchronized by controller 115 via the standard CEBus. Interface 95, buffers the data received from unit 90 to adjust the time intervals between data packets to provide a buffered data output that is MPEG compatible and complies with MPEG bit rate constraints.

In step 515, controller 115 directs the buffered output from interface 95 (the playback datastream) via mux 37 to PID selection units 45 and 47 using path select signal C. In step 520, units 45 and 47 and the remaining units of system 25 process the playback datastream either for storage via mux 110 or for application use via interface 70. Both the playback datastream from unit 95 and the transmitted datastream from selector 35, following selection via mux 37, are processed by system 25 in a similar manner. Both these datastreams are processed in the way previously described for the transmitted datastream. However, the playback datastream selected via mux 37 already incorporates the CPSI. Therefore, in the playback mode, controller 115 in step 520, does not perform the steps related to CPSI formation described in connection with FIGS. 2–4.

In the exemplary playback mode shown in FIG. 5, system 25 in step 520, transport decodes the playback datastream to provide decoded data to application decoders 80 and 85, for display. In this mode, system 25 applies the CPSI data contained in the playback datastream, in accordance with the MPEG standard, to provide a transport decoded datastream representing selected program SR.

In step 520, controller 115 accesses the playback datastream CPSI data via buffer 60 and examines the data for a change in version number occurring between successive CPSI elements. Controller 115 also examines the playback datastream for a discontinuity as indicated by a 'discontinuity indicator' in the packet header adaptation field (defined in section 2.4.3.5 of the MPEG systems standard). Upon detection of a change in version number or discontinuity, controller 115 applies the latest complete CPSI data to transport decode the playback datastream. It is to be noted that controller 115 may also be programmed to apply the latest complete CPSI data upon a variety of other conditions including detection of a continuity count mismatch between successive packets of a particular PID and transport error indications. Both of these parameters are present in the playback datastream packet headers (defined in section 2.4.3.2 of the MPEG systems standard). Controller 115 may also be programmed to apply the CPSI upon detection of a discontinuity between presentation times stamps (PTSs) or decoding time stamps (DTSs) that are defined in the MPEG standard or other user defined time stamps. Note however, that MPEG compatible syntax requires that the discontinuity indicator is set to indicate the occurrence of a continuity count mismatch.

The CPSI is applied in transport decoding the playback datastream using PID filters 45 and 47, decryptor 50, decoder 55, buffer 60 and control unit 65 in a manner similar to that previously described in connection with FIG. 1. The transport decoded datastream, excluding the CPSI, is provided, via interface 70, to application decoders 80 and 85 for MPEG decoding and image reproduction. In other modes, system 25 provides the playback datastream incorporating the CPSI to other application devices such as to high speed data port 75, for example. The CPSI is then available to be applied in transport decoding the playback datastream, as necessary, by these application devices or subsequent devices. If the playback datastream is to be stored to a second storage device other than device 90, for example, mux 110 provides the datastream, incorporating the CPSI, to the second storage device via a second storage interface. Further, the second storage device and interface (neither are shown in FIG. 1) mimic the operation and function of units 90 and 95 respectively.

In default periods, prior to applying the CPSI, system 25 provides decoded data to video decoder 85 representing a predetermined video image for display, such as a 'blue screen' or 'freeze frame', for example. Similarly, in default periods, prior to detecting the change in version number and applying the CPSI, system 25 provides data to audio decoder 80 to blank the audio output. These measures prevent annoying video or audio output to reproduction devices until the correct CPSI data has been applied to provide valid material for viewing or listening. The default periods include, for example, intervals from either of the following conditions:

a) detection of an end of program indicator or system power-on;

b) detection of a user command involving fast play or content skipping (trick play);

or c) detection of an error condition indicating no valid video packets have been detected, until detection of a change in CPSI element version number.

The data from interface 70, MPEG decoded by application decoders 80 and 85, is presented via audio and image reproduction devices in units 80 and 85 respectively. This completes the playback process which terminates at step 530. It is to be noted that controller 115 may alternatively employ any of the other methods previously discussed for preventing the application of incorrect CPSI data.

The architecture of FIG. 1 is not exclusive. Other architectures may be derived in accordance with the principles of the invention to accomplish the same objectives. Further, the functions of the elements of the FIG. 1 architecture and the process steps of FIG. 2–5 may be implemented in whole or in part within the programmed instructions of a microprocessor. In addition, the principles of the invention apply to any form of non-MPEG compatible electronic program guide and are not restricted to those conveyed in MPEG compatible PSI tables.

What is claimed is:

1. A method for generating a datastream from an input datastream representing a plurality of programs, comprising the steps of:

selecting a desired program from said plurality of programs;

identifying program content packets comprising said selected program;

forming condensed program specific information (CPSI) suitable for identifying and assembling said identified program content packets, said CPSI including program map information associating packet identifiers with individual packetized datastreams that constitute said selected program and excluding program map information related to said plurality of programs other than said selected program; and forming a datastream representing said desired program from said identified program content packets and said condensed program specific information.

2. A method according to claim 1, wherein
said formed datastream is MPEG compatible.

3. A method according to claim 1, wherein said program map information is MPEG compatible program map table information.

4. A method according to claim 1, including the step of
replicating said CPSI; and
inserting replicated CPSI into said formed datastream in a plurality of locations.

5. A method according to claim 4, wherein
said input datastream incorporates program specific information (PSI) suitable for recovering data content of said plurality of programs; and
said replicated CPSI occurs more frequently in said formed datastream than said PSI occurs in said input datastream.

6. A method according to claim 1, further including the step of
forming said identified program content packets into a content datastream whereby said desired program datastream is formed from said content datastream and said condensed program specific information.

7. A method according to claim 1, wherein
said CPSI includes one or more private data elements describing said program, selected from title, duration, program description, violence rating, age suitability rating, time of recording, date of recording, version list.

8. A method according to claim 7, wherein
one or more of said private data elements are included in a network information table (NIT).

9. A method according to claim 7, wherein
one or more of said private data elements are included in a user defined section of said program map information.

10. A method according to claim 1, wherein
said identified program content packets are encrypted; and
said CPSI includes an encryption code.

11. A method according to claim 10, wherein
said encryption code is included in a conditional access table (CAT).

12. A method according to claim 10, wherein
said encryption code is included in a user defined section of said program map information.

13. A method according to claim 10, wherein
said encrypted packets are decrypted with information derived using said encryption code.

14. A method according to claim 1, including the steps of
selecting a plurality of desired programs from said plurality of programs;
identifying program content packets comprising said selected programs;

forming condensed program specific information including program map information associating packet identifiers with individual packetized datastreams that constitute said selected programs.

15. A method according to claim 1, further including the step of
storing said CPSI and said identified program content packets on a storage medium.

16. A method according to claim 15, further including the step of
selecting a medium for storage.

17. A method according to claim 16, wherein said CPSI forming step includes the step of
adaptively forming said condensed program specific information (CPSI) to be suitable for said selected medium type.

18. A method according to claim 15, wherein said storing step includes the step of
storing said CPSI and said identified program content packets in separate locations on said storage medium.

19. A method according to claim 18, wherein
said separate locations are adjacent.

20. A method according to claim 18, wherein:
said storage medium is a linear type medium including a tape medium; and
said separate locations are selected from a) recording tracks comprising an auxiliary recording track adjacent to recording tracks storing said program and b) data management areas.

21. A method according to claim 15, wherein:
said storage medium is a nonlinear type medium.

22. A method for processing a program representative packetized datastream, comprising the steps of:
selecting said program representative datastream from an input datastream representing a plurality of programs;
identifying program content packets comprising said selected program;
forming program specific information (PSI) for identifying and assembling said identified program content packets, said PSI being adaptively generated to be suitable for a desired storage medium type; and
storing said PSI and said program content packets on a storage medium.

23. A method according to claim 1, including the steps of
identifying program specific information (PSI) packets associated with said selected program; and
using said PSI in forming said CPSI.

24. A method according to claim 22 wherein
said identified program content packets are encrypted; and
said PSI includes an encryption code.

25. A method according to claim 22, wherein, in said PSI forming step
said PSI is formed to include program map information associating packet identifiers with individual packetized datastreams that constitute said selected program and excluding program map information related to said plurality of programs other than said selected program.

26. A method according to claim 22, including the steps of
forming said PSI packets and said program content packets into respective groups; and
storing said groups in separate locations on said storage medium.

27. A method according to claim 26, wherein said groups are stored in prescribed adjacent locations.

28. A method according to claim 26, wherein:
said storage medium is a linear type medium including a tape medium; and
said separate locations are selected from a) recording tracks comprising an auxiliary recording track adjacent to recording tracks storing said program and b) data management areas.

29. A method for generating a condensed program guide from an input datastream representing a plurality of programs and containing a first program guide suitable for use in decoding said plurality of programs, comprising the steps of:

selecting a desired program from said plurality of programs; and forming a condensed program guide suitable for use in decoding said selected program by:

including program map information associating packet identifiers with individual packetized datastreams that constitute said selected program; and excluding program map information in said first program guide unrelated to said selected program.

* * * * *